2 Sheets--Sheet 1.

Thomas Ross
Stone Dressing Machine.

No. 120,169.  Patented Oct. 24, 1871.

Witnesses
Jos. L. Coombs
Chas L. Coombs

Inventor
Thos. Ross

Thomas Ross
Stone Dressing Machine
No. 120,169. Patented Oct. 24, 1871.

2 Sheets--Sheet 2.

Witnesses
Jos. L. Coombs
Chs. H. Coombs

Inventor
Thos. Ross

AM. PHOTO-LITHOGRAPHIC CO. N.Y. (OSBORNE'S PROCESS.)

UNITED STATES PATENT OFFICE.

THOMAS ROSS, OF RUTLAND, VERMONT.

IMPROVEMENT IN STONE-DRESSING MACHINES.

Specification forming part of Letters Patent No. 120,169, dated October 24, 1871; antedated October 14, 1871.

*To all whom it may concern:*

Be it known that I, THOMAS ROSS, of Rutland, in the county of Rutland and State of Vermont, have invented a new and useful Improvement in Stone-Dressing Machines; and I do hereby declare that the following is a full, clear, and exact description thereof, reference being had to the accompanying drawing.

My invention relates to a machine for cutting moldings on stone slabs, either around their edges or on interior lines, whether circular, ovoid, rectangular, or polygonal, with rounded or angular corners. My invention consists, essentially, of the following-described mechanism: First, a traveling pattern-plate to carry the slab operated upon, so constructed and arranged in combination with the driving machinery as to present the edge or other part of the stone to be operated upon constantly to the action of a revolving cutter-head while the stone is moving; second, two parallel racks upon the under side of said traveling-pattern plate conforming to the shape of the molding to be cut, into which gear two pinions, operated upon below the driving-machinery, and so arranged as to be rotated simultaneously or one at a time, as desired; or, in some cases, one rack and pinion, as hereinafter described; third, a shifting or adjusting-sleeve, through which the main driving-shaft passes and revolves, supported and moving in a standard attached to the rear part of the bed-plate of the machine, in such a manner that said sleeve and driving-shaft, with the cutter-head and its pertaining gearing, may be moved toward or from the center of the traveling-plate to adapt the machine to the purpose of operating upon slabs of various sizes; fourth, an adjusting center stud sliding in a slot in the table or bed-plate of the machine, to be used when the machine is employed for cutting circular moldings for fixing and changing the center according to the radius of the circle to be cut; fifth, two swivel-joints, by means of which the cutter-head may be set and operated at any desired angle to the slab without affecting the gearing by which it is rotated; sixth, a cutter-head provided with diamond cutters, set in a helical line around the same, and with their cutting-edges set obliquely to the axis of the cutter-head, as herein shown and described.

Figure 1:
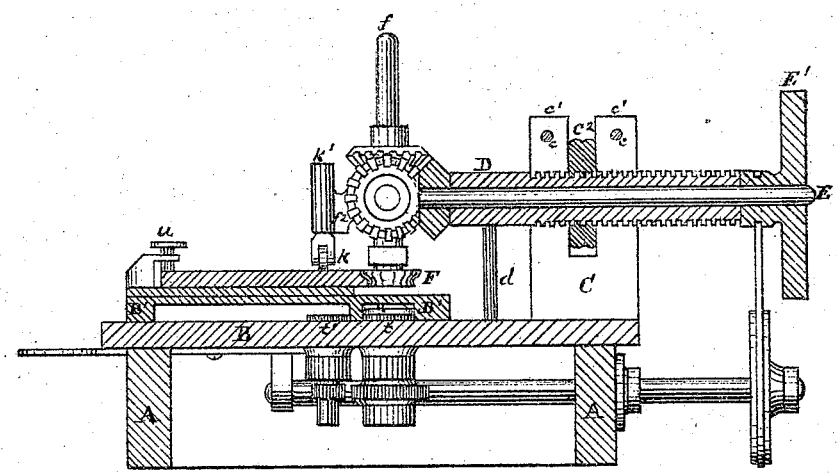
Figure 2:
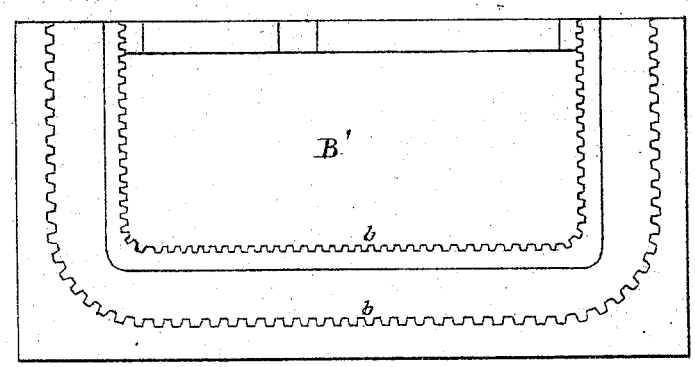
Figure 3:
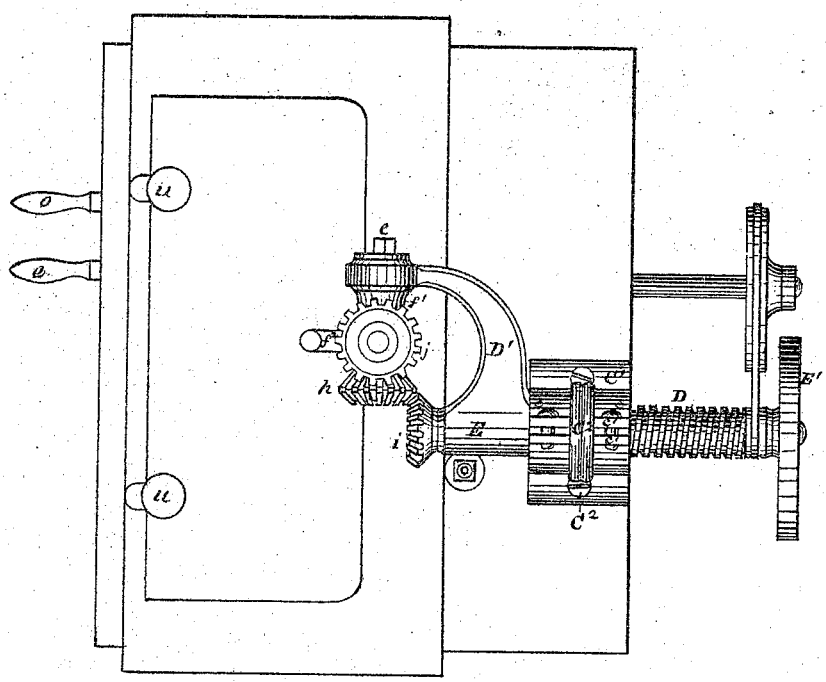
Figure 4:
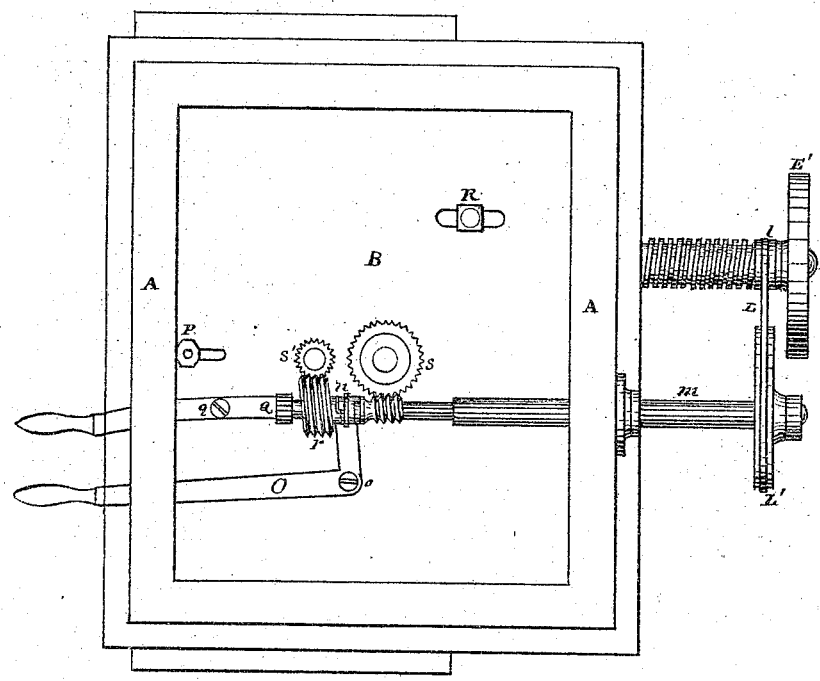

In the accompanying drawing, Figure 1 represents a sectional view of the machine through the driving-shaft and shifting sleeve longitudinally. Fig. 2 represents a view of the under side of the traveling-plate on an enlarged scale, showing the parallel racks. Fig. 3 represents a top view of the machine; Fig. 4 a bottom view of the same, and Fig. 5 a detached view of the cutter-head on an enlarged scale.

Like letters refer to the same parts in all the figures.

A is the box or frame on which the machine is mounted, and B the bed-plate or table. B' is the traveling-plate which carries the stone slab, and $b$ $b$ the parallel racks thereon. C is a vertical standard attached to the rear side of the table, and carring in an adjustable box, $C^1$, the shifting sleeve D, upon the outside of which a screw-thread is cut, which passes through and engages in a female screw cut through the nut-wheel $C^2$, set in a slot in said standard C. Through said sleeve D the main driving-shaft E passes, being driven by any suitable power applied to the wheel E'. D' is an arm extending from the sleeve D, and carrying the cutter-head with the gear-wheels by which it is immediately operated. F is the cutter-head, rigidly fixed on the lower end of a revolving shaft, $f$. This shaft passes through and turns in a hub, $f^1$, which is secured by a screw-bolt, $e$, passing through the end of the arm D' at right angles to the driving-shaft. Said bolt $e$ has a screw cut on that portion of its inner end which enters the hub $f^1$, and which engages with a female screw-thread in the end of said hub; but that portion of it which remains in the arm D' is cylindrical and smooth, so that it can be turned therein when the screw-bolt $e$ is a little loosened, so as to slacken its grip. On the inner end of said hub $f^1$ is a journal, on which is set a double bevel-gear wheel, $h$, which engages with a bevel-wheel, $i$, firmly fixed on the end of the driving-shaft E, and another bevel-wheel, $j$, firmly fixed on the shaft $f$, which carries the cutter-head. The box $C^1$, through which the sleeve D passes, is divided by a longitudinal opening on the top, and can be adjusted to grip the sleeve tightly or loosely by means of two set-screws, $c$ $c$, passing through flanges $c'$ $c'$, projecting from opposite sides of said divided box. It will be seen that by thus loosening the grip of the box $C^1$ upon the sleeve D the latter may be turned so as to raise or lower the end of the arm D', and thus incline the shaft of the cutter-head in either direction transversely to the line of the driving-shaft, and in like manner by loosening the screw-bolt $e$ so as to allow the hub $f$ to be turned the shaft of the cutter-head may be inclined in either direction in a plane parallel to the driving-shaft; but the turning of the sleeve D, or the hub $f$, or both, though changing the inclination of the cutter-head, will in no wise affect the gearing by which it is operated. From the hub $f$ projects an arm $f^2$, which carries a friction-wheel, $k$, the shaft or stem of which is held in a tubular socket-arm, $k'$, with a spiral spring in its upper end to give said friction-wheel an elastic bearing on the stone slab. When the sleeve D is so adjusted that the arm D' will be in a horizontal position, or parallel to the face of the table, it is supported by a removable staying-rod or prop, $d$, attached to and projecting from the lower side of said arm, with its lower end resting on the table. By slackening the grip of the box $C^1$ upon the sleeve D, as hereinbefore described, said sleeve may be moved longitudinally toward or from the center of the traveling-plate by turning the nut-wheel $C^2$, carrying with it the driving-shaft, the cutter-head, and its gearing to adapt the machine to work on slabs of various sizes. The traveling-plate B', carrying the slab to be operated upon, lies upon the table B, with the parallel racks on the under side, and with these racks two pinions, $t$ and $t'$, on the top of the table, engage and move the plate. These pinions are operated by means of a worm-gear on the under side of the table, and this worm-gear is operated by means of a band, L, passing around a hub, $l$, on the driving-shaft, and a wheel, L', on the end of the shaft $m$, which lies under the table, and which carries the worm-thread. Said wheel L' is adjustable longitudinally on the shaft $m$ for the purpose of keeping it in proper gear with the hub $l$. The larger pinion $t$ is operated by a worm-thread cut upon the shaft $m$ and engaging with a toothed wheel, $s$, mounted on the pinion-shaft under the table. The smaller pinion $t'$ is operated by a worm-wheel, $r$, mounted on the shaft $m$, and engaging with a toothed wheel, $s'$, on the shaft of said pinion. This worm-wheel $r$ sets loosely upon the shaft $m$, so that it will not turn therewith except when made fast by a sliding clutch, $n$, on said shaft. Said clutch is operated by an elbow-lever, O, having its fulcrum at $o$, by means of which it can be moved so as to clutch or release the worm-wheel $r$ at pleasure. When said clutch is so moved as to release the worm-wheel $r$ only the larger pinion $t$ will be rotated by the shaft $m$; but when it engages with said worm-wheel both pinions will be rotated by said shaft. In the accompanying drawing I have represented a traveling-plate adapted to cutting a rectangular molding with rounded corners; but when a circular or ovoid molding is to be cut the rack or racks on the traveling-plate must correspond with the form of the molding to be cut. For cutting in a straight line the machine must be so geared that the peripheries of the two pinions $t$ and $t'$ will move with the same velocity, so that the two parallel racks will travel the same distance in the same time. For cutting an ovoid molding it must be so geared that the two parallel racks will travel around together and in the same time. For cutting a true circle or segment of a circle but one rack and pinion need be employed, as the slab will then move around a fixed center, being the adjustable stud P, which is movable to and from the cutter-head in a slot in the table. When a slab with straight sides and rounded corners is to be cut, both pinions are rotated together by the worm-gear hereinbefore described while cutting upon the straight lines; but when a corner is to be turned the clutch $n$ is released from the worm-wheel $r$, so that the pinion $t'$ will not be rotated by the shaft $m$ while the curve is being operated upon. The shaft $m$ has its inner bearing in a stud projecting from the inner end and lower side of a lever, Q, under the table, with its fulcrum at $q$, by means of which the worm-thread may be thrown out of gear with both of the pinions $t$ and $t'$ when desired. Immediately above the pinion $t$, and mounted on the same shaft therewith, is a roller or circular disk, $x$, which fits into a rectangular groove in the pattern-plate, exactly corresponding with the line of the rack with which said pinion engages, and serves as a guide to the pattern-plate. R is an adjustable roller set in a slot in the table to aid in guiding the pattern-plate; but it is not considered indispensable.

Figure 5:
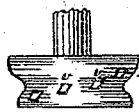

I propose to operate the nut-wheel $C^2$ by means of suitable gearing connected with a shaft extending to the front of the machine or any other convenient position. I use by preference a cutter-head having diamond cutters $v$ set in it at suitable distances apart. These diamond cutters I set in a helical line around the cutter-head, with their cutting edges oblique to the axis of the cutter-head, as shown in Fig. 5. It will be understood that the different cutter-heads must be used to cut moldings of different forms; and also that the pinions $t$ and $t'$ must be detachable, so that they may be exchanged for others when it becomes necessary to adapt them to the rack or racks of the traveling-plate. The stone slab is secured to the traveling-plate by means of two screw-clamps, $u$, or by other suitable means. Said traveling-plate is properly placed upon the table, and power is applied to rotate the driving-shaft E. The operation of the machine will be sufficiently understood by the description hereinbefore given.

What I claim as my invention, and desire to secure by Letters Patent, is—

1. In combination with the driving-shaft and rotary cutter-head, the adjusting sleeve D, carrying the driving-shaft, cutter-head, and bevel gearing herein described, constructed and arranged substantially as set forth.

2. In combination with the driving-shaft, cutter-head, and bevel-gearing herein described, two swivel-joints between the driving-shaft and cutter-head, to allow the said cutter-head to be set and operated at any desired angle to the slab, substantially as set forth.

3. In combination with the adjusting sleeve carrying the driving-shaft and cutter-head, the screw-thread thereon, and the adjusting nut-wheel $C^2$, substantially as and for the purpose described.

4. In combination with the revolving cutter-head, the traveling pattern-plate with a single or double rack thereon conforming to the shape of the molding to be cut, and a circular guide-roller or disk, $x$, concentric with the feed-pinion, and fitting into a groove in the pattern-plate also conforming to the shape of the molding to be cut, substantially as described.

5. In combination with the cutter-head, the traveling pattern-plate with a double or single rack corresponding to the shape of the molding to be cut, and a pinion or pinions engaging with said rack or racks, the worm-gear herein described for operating said pinion or pinions, substantially as set forth.

THOS. ROSS.

Witnesses:
  J. J. COOMBS,
  JOS. L. COOMBS.

(153)